(12) United States Patent
Ainley et al.

(10) Patent No.: US 6,728,995 B2
(45) Date of Patent: May 4, 2004

(54) SPECTACLES CADDY

(75) Inventors: Leanne Ainley, 371 Kingston Crescent, Winnipeg, Manitoba (CA), R2M 0T7; Andrew Ainley, 371 Kingston Crescent, Winnipeg, Manitoba (CA), R2M 0T7

(73) Assignees: Leanne Ainley, Winnipeg (CA); Andrew Ainley, Winnipeg (CA)

( * ) Notice: Subject to any disclaimer, the term of this patent is extended or adjusted under 35 U.S.C. 154(b) by 0 days.

(21) Appl. No.: 09/932,946

(22) Filed: Aug. 21, 2001

(65) Prior Publication Data

US 2002/0162194 A1 Nov. 7, 2002

(30) Foreign Application Priority Data

Aug. 21, 2000 (CA) ............................................. 2316565

(51) Int. Cl.[7] ............................................... A44B 21/00
(52) U.S. Cl. ............................................ 24/3.3; 24/3.8
(58) Field of Search ........................... 24/3.2, 3.11–3.13, 24/3.8, 3.7, 3.1, 326, 336, 501, 499; 224/194, 252, 269; 206/5; D3/265

(56) References Cited

U.S. PATENT DOCUMENTS

| 1,515,180 | A | * | 11/1924 | Taylor ............................ 24/3.8 |
| 3,994,391 | A | * | 11/1976 | Holland .......................... 206/5 |
| 4,000,810 | A | * | 1/1977 | Leblanc .......................... 206/5 |
| 4,659,000 | A | * | 4/1987 | Sales et al. .................. 224/269 |
| 4,768,648 | A | * | 9/1988 | Glass ........................... 150/137 |
| 5,123,525 | A | * | 6/1992 | Orlowski ........................ 206/5 |
| 5,312,029 | A | * | 5/1994 | Tuber ........................... 224/241 |
| 5,501,321 | A | * | 3/1996 | Liu ................................ 206/5 |
| 5,528,470 | A | * | 6/1996 | White ......................... 362/135 |
| 5,626,224 | A | * | 5/1997 | Clark et al. ..................... 206/5 |
| 5,676,242 | A | * | 10/1997 | Scott ............................. 206/5 |
| 5,711,417 | A | * | 1/1998 | Tilve ............................. 206/6 |
| 5,833,053 | A | * | 11/1998 | Wood et al. ................... 206/5 |
| 5,899,371 | A | * | 5/1999 | Weliver ....................... 150/112 |
| 5,924,558 | A | * | 7/1999 | De Mayo ..................... 206/37 |
| 6,125,513 | A | * | 10/2000 | Cheraso et al. ............. 224/269 |
| D437,113 | S | * | 2/2001 | Koehler ....................... D3/219 |
| 6,210,003 | B1 | * | 4/2001 | Chan ............................. 24/3.3 |
| 6,263,546 | B1 | * | 7/2001 | Baldwin et al. ............... 24/3.3 |
| D448,563 | S | * | 10/2001 | Kim ............................ D3/266 |
| 6,314,610 | B1 | * | 11/2001 | Miller et al. ................. 15/347 |

FOREIGN PATENT DOCUMENTS

BE 066565 A2 * 12/1982
JP 10-226279 * 8/1998

* cited by examiner

*Primary Examiner*—Anthony Knight
*Assistant Examiner*—André L. Jackson
(74) *Attorney, Agent, or Firm*—Shapiro Cohen

(57) ABSTRACT

A spectacles caddy can be attached by its spring clip to a vehicle visor or other similar substantially flat, thin, and stiff object. The shell of the caddy is made in two shallow elongate half boxes attached together at one short end by a hinge, and at the other by a latch closure. The latch is released by an exterior push button. A deformable member is provided in each shallow half box to grip the arms of a pair of spectacles inserted into the caddy. The longer side of each shallow half box also includes recesses, so that the sides do not grip the spectacle arms. The hinge is also constructed to limit the angular opening of the caddy to at most 45°, and preferably to about 30°, so that when in use attached, for example to a vehicle visor, the spectacles do not fall out when the caddy is opened to retrieve them.

10 Claims, 4 Drawing Sheets

SPECTACLES CADDY

This invention is concerned with a holder or caddy for the storage of spectacles, including both sunglasses and prescription spectacles, and similar items. More particularly, this invention is concerned with a caddy for prescription glasses or sunglasses which is relatively compact, which will store glasses safely, which is easily opened and closed, and which can be readily attached to a number of potential supporting items, such as a vehicle visor, a clothing belt, a baby stroller, a golf bag or golf cart, and a boat.

Many people find it necessary to use sunglasses, which may or may not incorporate prescription lenses, under bright sunlight conditions. Since light conditions are not always sufficiently bright as to require the use of sunglasses, the user needs a storage caddy wherein sunglasses can be safely carried. In addition, in a number of circumstances, the user also needs to be able to access the sunglasses without difficulty from the caddy, and also be able to replace them there with a similar lack of difficulty. It is also desirable that such a caddy be able to accept for storage a pair of prescription glasses, when these are removed by the wearer and replaced by sunglasses. This is particularly important to the driver or a vehicle, who needs to be able to access sunglasses with minimal distraction from the requirements of safe driving, and if necessary to be able to store prescription spectacles equally easily.

It is also desirable that, although the storage caddy should provide easy access to a pair of spectacles contained therein, when the caddy is opened, the spectacles (or other items) contained therein should not be able to fall out. For a vehicle driver, for example, this would pose a significant problem since it would complicate changing to or from sunglasses quickly and safely.

It is also desirable that a storage caddy should not be limited to use in only one environment: for example, a person may drive to v golf course or a boat dock, and wish to able to transfer the caddy readily from a car to a boat, a golf bag, or a golf cart, or even onto a clothing belt.

This invention seeks to provide a caddy which meets these requirements. The caddy of this invention includes a spring clip which can be readily attached to a number of objects, such as a vehicle visor, which are moderately thin, reasonably flat, and reasonably stiff. The caddy of this invention also includes parts fabricated from an elastomer which will grip safely more than one size or shape of spectacles, both sunglasses and prescription glasses. This is facilitated in the caddy of this invention in that it is the arms of the spectacles, not the delicate central bridge portion of the spectacles, which is gripped in the caddy. Furthermore, the caddy of this invention is so constructed that, when mounted according to the teachings of this invention, for example to a vehicle visor, a pair of glasses contained therein will not fail out and can be readily removed when the caddy is opened.

In its broadest embodiment thus invention seeks to provide a spectacles caddy for sunglasses, prescription glasses, and the like comprising in combination:

- a two part caddy body, whose length is greater than its width, comprising a first caddy body member and a second caddy body member, each shaped as a shallow halt box with a base and upstanding sides;
- cooperating recesses in the longer sides of the first and the second body members adapted to receive the arms of a pair of spectacles;
- a hinge means joining the first and second body members together located substantially at the midpoint of a first shorter side each of the first and second members, and adapted to limit the maximum angle between the first and second body members when the caddy is open to about 45°;
- a latch means adapted to hold the caddy closed located substantially at the midpoint a second shorter side of each of the first and second body members and including
- a push button means attached to the first member adapted to open the latch means;
- a first and a second deformable insert means within each of the shallow half boxes provided by the first and second members adapted to grip the arms of a pair of spectacles located in the recesses when the caddy is closed; and
- a substantially U-shaped spring clip means having a first and a second leg, adapted to engage a relatively flat, relatively stiff, and relatively thin object by separating the second leg from the first leg, attached to the outside of the base of the first member along its length with the closed end of the U-shaped spring clip means adjacent the push button means.

Preferably, the caddy has curved sides, including two longer curved sides of substantially the same length, and two shorter curved sides of different lengths, and the latch and push button means are located at the midpoint of the shortest curved side.

Preferably, the first and the second deformable means are fabricated a single deformable means which is folded within the caddy, the fold being adjacent to the hinge means.

Preferably, the deformable means includes deformable channel members in which the closed face of the channel grips a pair of spectacles when the caddy is closed.

Preferably, the deformable means is fabricated from an elastomeric material.

A preferred embodiment of the invention will now be described with reference to the attached drawings in which.

Figure 1:
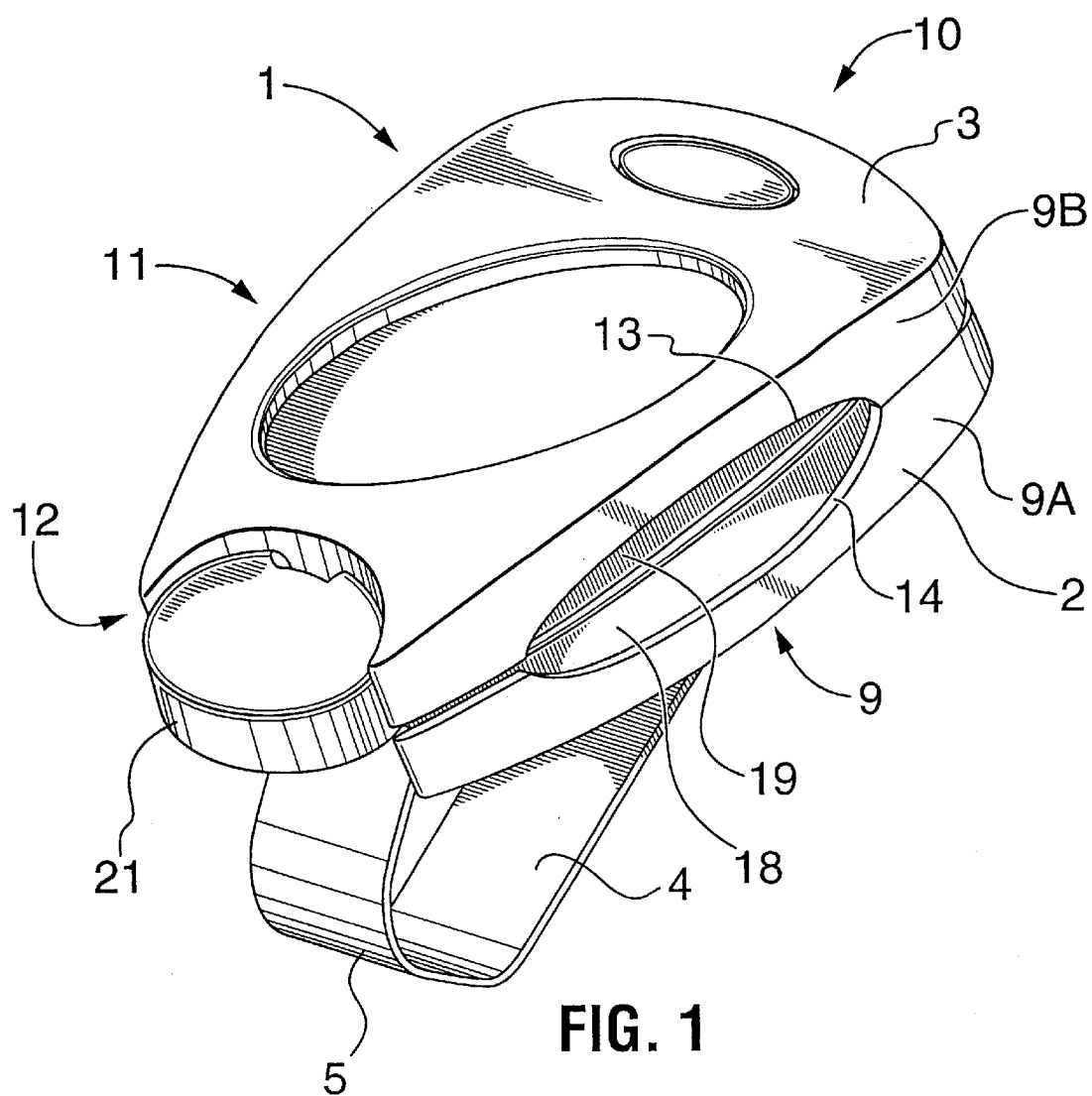
FIGS. 1 and 2 show a top and a bottom perspective view it respectively of the caddy from the end including the push button.
Figure 2:
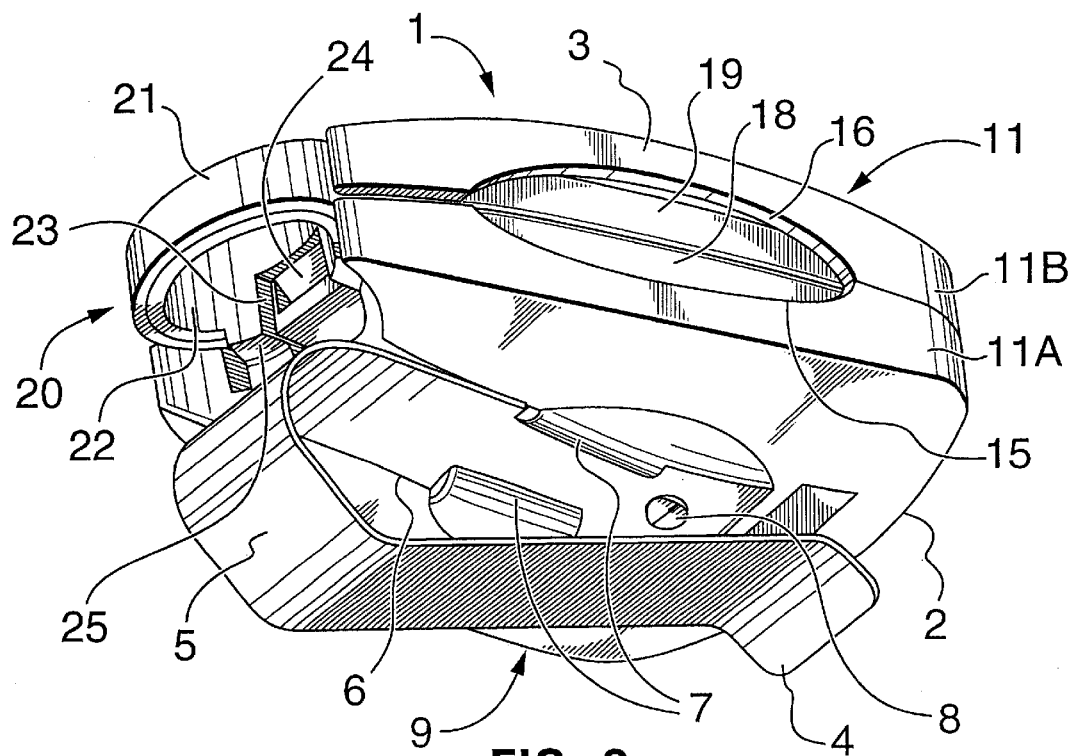
Figure 3:
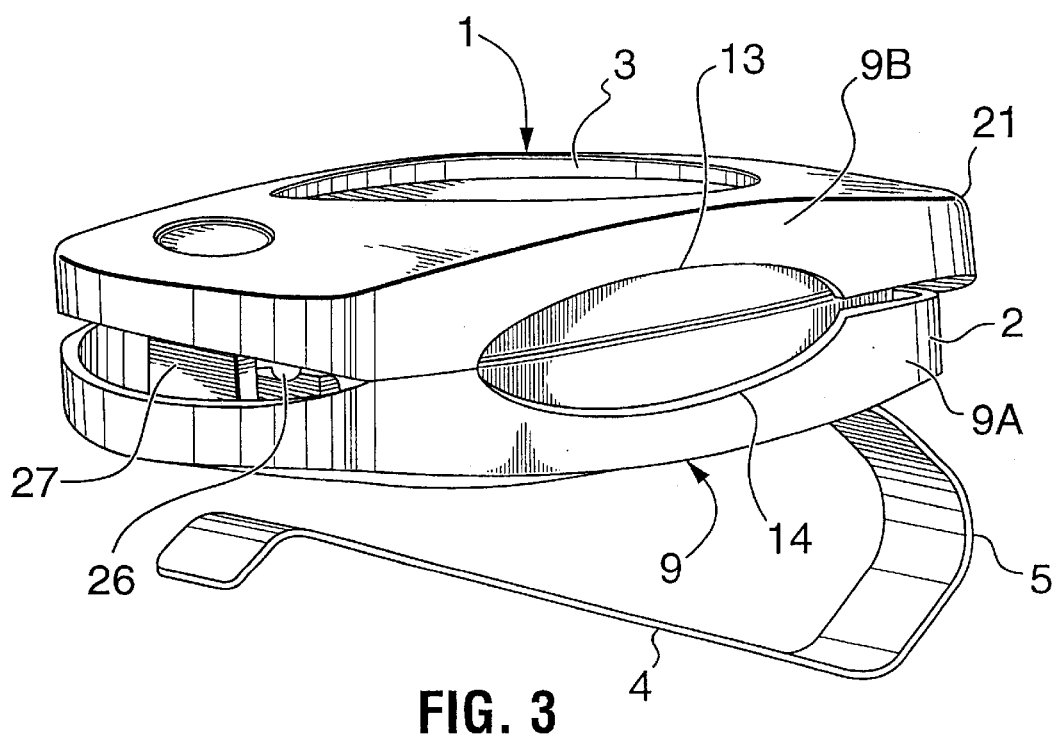
FIG. 3 shows a bottom perspective view of the caddy from the hinge.

In the embodiment shown in FIGS. 1, 2 and 3 the caddy 1 has a two part body comprising the first body part 2 and the second body part 3.

A clip 4 is attached to the outside of the first body member 2. The clip is substantially U-shaped. The separation of the legs of the U-shape at the closed end 5 of the clip 4 is chosen to allow secure attachment to a variety of objects which are flat enough and stiff enough to accept the clip. These will include a vehicle visor, a golf bag, a part of a golf cart, a boat or a baby stroller, and a clothing belt. The clip is attached to the member 1 by a conventional track 6, retainer 7 and pin 8 arrangements other attachment arrangements are well known. The clip is fabricated from a suitable metal, and can be coated, for example with plastic material, as a protection for the surface to which it is attached.

The caddy 1 is generally trapezoidal in shape, with two longer curved sides 9, 11 of the same length, and two shorter curved sides 10, 12 of different lengths, of which side 12 is the shortest. The clip 4 is attached to the member 2 with its closed end 6 adjacent the shortest side 12.

Each of the longer curved sides 9A, 9B and 11A, 11B of the two shallow half box members 2 and 3 include pairs of cooperating recesses 13, 14, 15 and 16. These recesses are adapted to allow a pair of spectacles or sunglasses to be placed into the caddy. When the caddy is closed as shown in these Figures, the recesses substantially prevent engagement of the half box sides 9A and 9B as one pair, and the sides 11A and 11B as the second pair, onto the spectacles. The spectacles are gripped between the deformable parts 18 and 19 of the deformable insert 17 (see FIGS. 5 and 6, below).

At substantially the middle of the shortest side 12 is located a push button means. When this button is pressed, the caddy opens, and spectacles can be either inserted or removed. The construction of the push button means is described below.

It can also be seen from FIGS. 1, 2 and 3 that when the caddy 1 is attached by the clip 4 to, for example, a driver's sun visor, the trapezoidal shape will have its narrowest edge at the top, thus favouring insertion of the arms of a pair of folded spectacles into the caddy.

Figure 4:
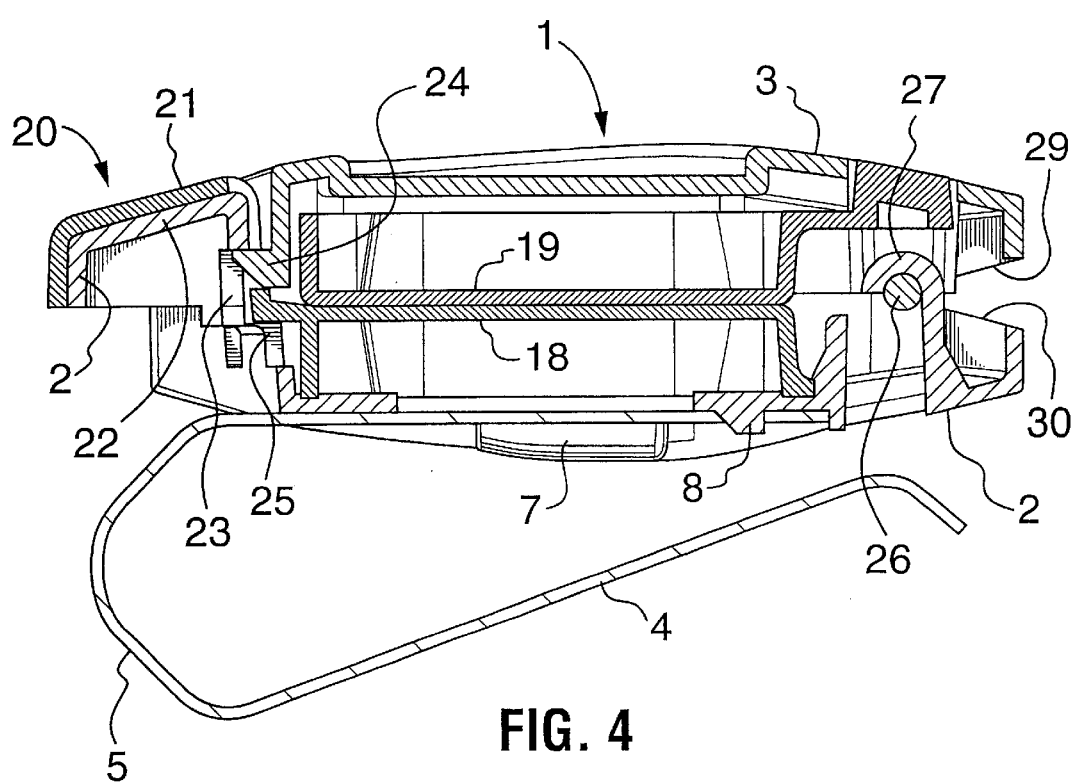
FIG. 4 shows a cross section of the caddy in the closed position, taken on its long axis.

Further constructional details can be seen in the cross section shown in FIG. 4, which is taken on the long axis of the caddy 1.

Figure 5:
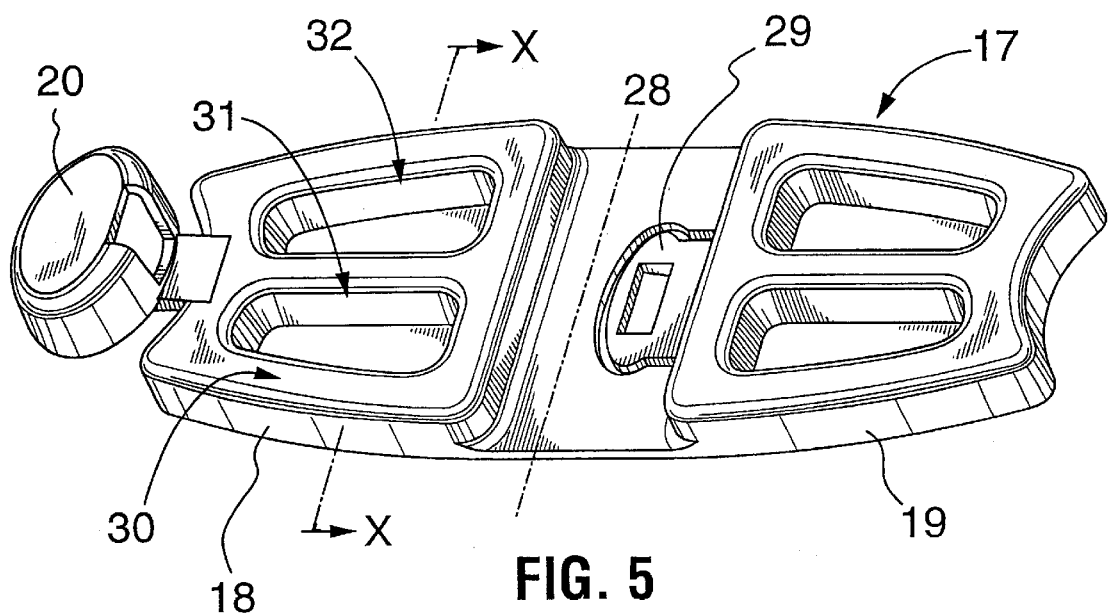
FIG. 5 shows the deformable means of FIG. 4.
Figure 6:
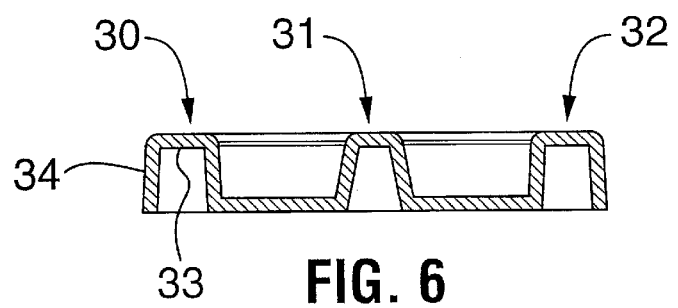
FIG. 6 shows a cross section of FIG. 5 on the line X—X.

Referring first to the push button means, this includes a cover 21 which is made integrally with the part 19 of the deformable member which is located in member 2 (see FIG. 5).

The cover 21 fits over the push button 22, which is part of the member 2. The push button includes a notch 23 which engages with a latch hook 24, formed as part or the member 3. Pressure on the push button cover 21 bends the flexible part 25 of the push button 22, and disengages the latch hook 24 from the notch 23. This latching arrangements conventional, and other arrangements are well known.

At the other end of the caddy, the two members 2 and 3 are joined together by a hinge, including a hinge pin means 26, and a hook 27. As can be seen in FIGS. 3 and 4, the hinge pin means 27 is formed integrally with member 3, and the hook 27 is formed integrally with member 2 thus permitting snap-fit engagement of the two members 2 and 3. The hinge means only permits a limited amount of movement of the hook 27 about the pin 26. The amount of movement is determined by the face 29 on member 3 and 30 on member 2. These faces are arranged to limit the maximum opening angle between the members 2 and 3 to about 45°. In practise, it has been found that a smaller opening angle than this is satisfactory, of about 30°.

The deformable member 17 is shown in FIG. 5. As shown, the member 17 is made in one piece, with a part 18 which fits into the shallow box provided by the fist member, and a part 19 which fits into the shallow box provided by the second member 3. When inserted, it is folded approximately on the line 28, with the outer side of the button 29 visible in the member 3. Each of the parts 18 and 19 is similarly constructed as a set of hollow channels as at 30, 31, 32. As shown in the exemplary cross section of FIG. 6, taken on the line X—X in FIG. 5, each of these channels has a relatively thin top surface 33, and similarly thin sidewalls 34. When the arms of a pair of spectacles are inserted into the open caddy, by lowering the spectacles with the arms closed over the narrow end of the second member, and the caddy then closed, as noted above the arms fit into the recesses 13–16 in the sides 9 and 11 of the two members, but are not gripped by the recesses. As the caddy is closed, the hollow channels in the parts 18 and 19 are deformed by the inserted arms, thus safely holding the spectacles.

As shown, the deformable inserts 18 and 19 are made integrally; they can be made as two separate parts.

The two half box members 2 and 3 are suitably fabricated as injection mouldings from a suitably rigid plastic, such a polycarbonate. The material used for the deformable member, or members, needs to be chosen with some care, in combination with the cross section adopted for the parts of the deformable member or members which grip the arms of the spectacles when the caddy is closed. A suitable elastomer for the construction shown in FIG. 5 has been found to be a neoprene such a Santoprene (trade mark).

What is claimed is:

1. A spectacle caddy for sunglasses and prescription glasses having frames including arms comprising in combination:

a two part body having a first caddy body member and a second caddy body member each shaped as a shallow half box with a base and upstanding sides and ends, and cooperating recesses in the sides of the first and second body members to receive the arms of a pair of glasses;

hinge means joining the ends of the first and second body members, including an integral pin on one of the body members snapped fitted into a hook means on the other body member, the hook means extending over the pin to prevent accidental separation of the body members in an open position;

wherein the hinge means limits a maximum angle of opening between the first and second body members by limiting the amount of movement of the hook means about the pin;

a latch on the end of one of the first and second body members opposite to the hinge means, the latch including a pushbutton means attached to one of the body members for disengaging the latch on the other one of the body members; and integral first and second deformable means of synthetic elastomer including deformable channel members having closed faces for grasping the arms of the glasses, the first and second deformable means being folded within the caddy to provide a fold adjacent the hinge means and biasing the first and second body members to an open position when unlatched.

2. The spectacle caddy as in claim 1, further including a cap partially covering the pushbutton means.

3. The spectacle caddy as in claim 1, further including a flat U shaped spring clip secured in opposed retaining members and by a pin engaging an aperture in the clip.

4. The spectacle caddy as in claim 1, wherein a flat U shaped clip of flat spring metal is secured in opposed retaining members on a body member of the two part body member and is engaged by a pin on the body member engaging an aperture in the clip.

5. The spectacle caddy as in claim 1, wherein the caddy has curved sides, including two longer curved sides of substantially the same length, and two shorter curved sides of different lengths, and the latch and push button means are located at the midpoint of the shortest curved side.

6. The spectacle caddy as in claim 1, wherein the first and the second deformable means are fabricated as a single deformable means which is folded within the caddy.

7. The spectacle caddy as in claim 1, wherein the deformable means includes deformable channel members in which the closed face of the channel grips the arms of a pair of spectacles when the caddy is closed.

8. The spectacle caddy as in claim 1, wherein the deformable means is fabricated from an elastomeric material.

9. The spectacle caddy as in claim 1, wherein the hinge means limits the maximum angle of opening to 45° between the first and second body members.

10. The spectacle caddy as in claim 1, wherein the caddy body is of a substantially trapezoidal shape, the shallow boxes of the first and second members each having two longer curved sides of substantially the same length, and two shorter curved sides of differing lengths, the longest of which is the first side of the first and second members.

\* \* \* \* \*